US008360586B2

(12) United States Patent
Buoni

(10) Patent No.: US 8,360,586 B2
(45) Date of Patent: Jan. 29, 2013

(54) RETROREFLECTIVE FILM CONTAINING A POLYMERIC FACE FILM AND METHOD OF MANUFACTURE THEREFORE

(75) Inventor: Drew J. Buoni, North Richland Hills, TX (US)

(73) Assignee: Aura Optical Systems, LP, Fort Worth, TX (US)

( * ) Notice: Subject to any disclaimer, the term of this patent is extended or adjusted under 35 U.S.C. 154(b) by 308 days.

(21) Appl. No.: 12/889,231

(22) Filed: Sep. 23, 2010

(65) Prior Publication Data

US 2011/0013282 A1    Jan. 20, 2011

Related U.S. Application Data

(63) Continuation-in-part of application No. 12/356,614, filed on Jan. 21, 2009.

(60) Provisional application No. 61/039,877, filed on Mar. 27, 2008.

(51) Int. Cl.
G02B 5/124 (2006.01)
G02B 5/128 (2006.01)
B41M 5/382 (2006.01)
B32B 3/00 (2006.01)

(52) U.S. Cl. ........ 359/542; 359/529; 359/530; 359/536; 359/538; 359/539; 359/540; 359/541; 359/546; 428/141; 428/142; 428/147; 428/156; 428/157; 428/161; 428/162; 156/60

(58) Field of Classification Search .................. 359/529, 359/530, 536, 538, 539, 540, 541, 542, 546; 428/141, 142, 147, 156, 157, 161, 162; 156/60
See application file for complete search history.

(56) References Cited

U.S. PATENT DOCUMENTS

| 2,407,680 A | 9/1946 | Palmquist |
| 3,689,346 A | 9/1972 | Rowland |
| 4,025,159 A | 5/1977 | McGrath |
| 4,367,920 A | 1/1983 | Tung et al. |
| 4,832,772 A | 5/1989 | Noguchi et al. |
| 5,916,725 A | 6/1999 | Patel et al. |
| 6,120,967 A | 9/2000 | Hopper et al. |
| 7,179,575 B2 | 2/2007 | Moffat et al. |
| 2004/0182269 A1 | 9/2004 | Kawamura |
| 2007/0212499 A1 | 9/2007 | Takehara |
| 2009/0246465 A1 | 10/2009 | Buoni |

FOREIGN PATENT DOCUMENTS

| GB | 2419110 A | 4/2006 |
| JP | 2002243924 | 8/2002 |
| WO | 2009120398 A1 | 1/2009 |

OTHER PUBLICATIONS

Finston, Eric, et al.; "Surface Treatment": Wiley Encyclopedia of Package Technology, Second Edition, John Wiley & Sons, 1997; 12 pages.
Morelock, Cody R.; AFM studies of corona-treated, biaxially oriented PET film; Converting Magazine, Dec. 1, 2007 (http://www.convertingmagazine.com/article/print/310989-AFM studies of corona treatment; Mar. 31, 2010); 5 Pages.
NatureWorks PLA Film Technical Bulletin; "Surface Treatment"; NatureWorks, LLC 2005; 4 Pages.

*Primary Examiner* — David Sample
*Assistant Examiner* — Kendra Keith

(57) ABSTRACT

In one aspect, there is provided a retroreflective film, comprising a retroreflective sub-structure, and a transparent polymeric film, having a surface roughness profile where the Arithmetic Mean Deviation of the Roughness Profile (Ra) ranges from about 0.18 microns to about 1.30 microns and where the Mean Spacing of Local Peaks (R-S) in the printing direction ranges from about 10 microns to about 85 microns, located over and coupled to the retroreflective sub-structure and wherein the polymeric film as a Vicat softening point of about 90° or greater.

21 Claims, 4 Drawing Sheets

RETROREFLECTIVE FILM CONTAINING A POLYMERIC FACE FILM AND METHOD OF MANUFACTURE THEREFORE

CROSS REFERENCE TO RELATED APPLICATION

This application is a continuation-in-part of U.S. application Ser. No. 12/356,614 filed on Jan. 21, 2009, entitled "AN IMPROVED RETROREFLECTIVE FILM CONTAINING A POLYMERIC FACE FILM AND METHOD OF MANUFACTURE THEREFORE," which was also filed as PCT Application No. PCT/US2009/031483 filed on Jan. 21, 2009 and was published as WO 2009/120398 A1, which claims the benefit of U.S. Provisional Application Ser. No. 61/039,877 filed on Mar. 27, 2008, entitled "AN IMPROVED REFLECTIVE FILM CONTAINING A POLYMERIC FACE FILM AND METHOD OF MANUFACTURE THEREFORE," all commonly assigned with the present invention and incorporated herein by reference.

TECHNICAL FIELD

The invention is directed to an improved retroreflective film and a method of manufacturing that film.

BACKGROUND

Vehicle number plates (i.e. license plates) are commonly made to be retroreflective in order to enhance the visibility of the number plate at night.

Certain methods of fabricating retroreflective number plates commonly involve the lamination of a thin retroreflective film (also commonly referred to as a retroreflective sheeting) to the back-side of a thick, clear plastic plate. The lamination of the retroreflective film to the clear plastic plate is often achieved with an optically clear pressure-sensitive adhesive. The clear plastic plate is commonly made from either acrylic or polycarbonate resin and is typically about 0.125 inches thick.

When retroreflective number plates are used for the purposes of vehicle registration, the number plates applied to each individual vehicle must contain a unique set of alphanumeric characters or other characters or symbols. These characters are printed (or otherwise created) on either the back surface of the plastic plate or on the top surface of the retroreflective film prior to laminating the retroreflective film to the plastic plate. The most common method currently employed to print these characters is to use a computer-controlled printer such as a thermal transfer printer, an ink jet printer, or a laser printer to print the characters on the front-surface of the retroreflective sheeting.

The retroreflective film employed to fabricate a number plate can include any of commonly known retroreflective sheeting constructions and can incorporate any of the commonly known retroreflective elements including glass microspheres or microprisms. The three most common retroreflective sheeting constructions include enclosed lens retroreflective sheeting (incorporating the glass microspheres), encapsulated lens retroreflective sheeting (also incorporating glass microspheres) and microprismatic retroreflective sheeting. U.S. Pat. Nos. 2,407,680 and 4,367,920 provide detailed descriptions of the design and manufacture of enclosed lens sheeting and are incorporated herein by reference. Also, U.S. Pat. Nos. 3,109,178 and 4,025,159 provide detailed descriptions of encapsulated lens sheeting, and U.S. Pat. Nos. 3,689,346 and 4,588,258 provide descriptions of microprismatic sheeting, which are incorporated herein by reference.

Not all retroreflective sheeting materials, however, can be successfully printed through thermal transfer printers, laser printers, ink jet printers, or other printers. To be acceptable for use in the fabrication of numbered plates, a high print quality is required. Generally, the print quality is judged across several different criteria. First, the coverage of the print must be complete without any signs of pin-holes or other print voids, and the depth of coverage should be full enough to provide a deep, fully saturated print. When printing opaque colors such as black, the surface of the retroreflective sheeting should not show through the print. Second, the edges of printed alphanumeric characters must be straight, clean and sharp. Corners should be square. Print edges that are wavy or undefined are generally not acceptable. Third, the printed surface should be uniform without any smudging or smearing. This smearing or smudging effect is especially common with thermal transfer printing when printing letters such as "E", "F", "H", or "T" from left-to-right where there exists a long horizontal bar of printing.

Obtaining a high quality print through a laser printer presents several additional challenges. In many instances, materials which successfully print through a thermal transfer printer or ink jet printer may not yield the same quality results through a laser printer. Generally speaking, laser printers operate through several basic steps. First, a photoreceptive rotating drum inside a laser printer is given an overall positive electrostatic charge. Second, through the use of a laser, this photoreceptive rotating drum is then given a negative electrostatic charge in selective areas corresponding to the image to be printed. Third, the rotating drum is brought into contact with the printing toner, which is a very fine colored plastic powder that has been positively charged. Due to the electrostatic attraction between the negatively charged areas of the rotating drum and the positively charged toner, the toner particles will bond to these selective areas of the drum. On the other hand, the toner particles will not bond to those areas of the rotating drum still retaining a positive charge, which corresponds to the non-printed background on an image.

Next, the printing substrate (i.e the retroreflective sheeting) is passed through the laser printer and is given its own negative electrostatic charge. The magnitude of the negative electrostatic charge on the printing substrate is greater than the negative charge on the rotating drum. The printing substrate is next brought into contact with the rotating drum, and the toner particles are transferred from the drum to the printing substrate through electrostatic attraction. To prevent the printing substrate from clinging to the positive areas of the rotating drum, the electrostatic charge on the substrate is immediately discharged after the toner is transferred to it. Next, the printing substrate is passed through a set of heating rollers to fuse (i.e. melt) the toner to the substrate. Finally, the substrate passes through a cleaning mechanism to remove any residual toner particles.

Laser printers create an especially difficult printing challenge for retroreflective sheeting. First, the sheeting must be able to withstand the high temperatures associated with the toner fusion process. This high heat can cause the retroreflective sheeting to wrinkle or become dimensionally distorted, which can lead to a poor print quality or make subsequent lamination to a plastic plate very difficult. Further, when printing over larger areas with a laser printer, the printed image should remain consistently bold in appearance across the entire printed area without any fading or lightening of the image. Additionally, each individual alphanumeric character or symbol to be printed should only appear once without any secondary repeated images of the same character or symbol. When such repeated imaging print defects occur, they often appear as a lighter "shadow" or "ghosting" of the initially printed character. In many instances, the occurrence of such secondary repeated images will then impact the printing of any subsequent characters as well. It is believed that such secondary repeated images or shadow effects are a result of the toner not completely transferring to or bonding to the retroreflective sheeting surface. These latter two performance attributes are especially important when printing the larger sizes of many European vehicle number plates, which may exceed 20 inches in length.

In today's environment of rapidly changing technology, it is very common for multiple printer technologies to be located in the same number plate manufacturing facility. For example, there may be several different models of both thermal transfer printers and laser printers located in the same facility. Furthermore, different models and different brands of printers may function very differently. For example, the chemistry of ink jet printing inks utilized in different printer brands can vary greatly and have different drying or printing characteristics. Likewise, the toner utilized in different brands of laser printers may fuse at different operating temperatures. With the desire to maintain low inventory levels and to simplify manufacturing supply chains, there is an additional need that the same retroreflective sheeting be capable of producing high quality prints through multiple printer technologies and printer models. It would be advantageous for the same retroreflective sheeting to be printable on multiple models and brands of thermal transfer, laser, and ink jet printers.

Certain conventional methods have attempted to overcome these printing challenges by creating a matte surface on the face of the enclosed lens sheeting during conventional manufacturing processes. Though these conventional approaches have allowed for an improved print quality, they do not always provide consistent print results, and there is a significant potential for scrap using this method of manufacturing. Moreover, the most pronounced problem with this approach is the presence of pin-holes or printing voids when thermal transfer printing on the surface of the enclosed lens sheeting. These defects are often caused by surface imperfections in the top-coat of the retroreflective film, including air-bubbles, surface pits, pin-holes, and similar coating defects. Further, many such sheetings cannot withstand the high temperatures associated with laser printers or do not provide the proper surface to allow fusion of the toner. Such sheetings often display a significant amount of dimensional distortion or may even melt when being processed through a laser printer. Further, the overall print quality through laser printers may be very poor with a significant amount of print defects.

SUMMARY

One embodiment of this disclosure provides a retroreflective film comprising a retroreflective sub-structure and a transparent polymeric film, having a surface roughness profile where the Arithmetic Mean Deviation of the Roughness Profile (Ra) ranges from about 0.18 microns to about 1.30 microns and where the Mean Spacing of Local Peaks (R-S) in the print direction ranges from about 10 microns to about 85 microns, located over and coupled to the retroreflective sub-structure. Additionally, the polymeric film has a Vicat softening point of about 90° C. or greater.

In another embodiment, another retroreflective film is provided. This embodiment comprises a backing film, a first adhesive layer located over the backing film, and an enclosed lens retroreflective film located over the first adhesive layer. The embodiment further comprises a transparent polymeric film, having a Vicat softening point of about 90° C. or greater and a surface roughness profile where the Arithmetic Mean Deviation of the Roughness Profile (Ra) ranges from about 0.18 microns to about 1.30 microns and where the Mean Spacing of Local Peaks (R-S) in the printing direction ranges from about 10 microns to about 85 microns, located over and coupled to the enclosed lens retroreflective film.

In still another embodiment, another retroreflective film is provided. This embodiment comprises a backing film, a first adhesive layer located over the backing film, and a microprismatic retroreflective film located over the first adhesive layer. The embodiment further comprises a transparent polymeric film, having a Vicat softening point of about 90° C. or greater and a surface roughness profile where the Arithmetic Mean Deviation of the Roughness Profile (Ra) ranges from about 0.18 microns to about 1.30 microns and where the Mean Spacing of Local Peaks (R-S) in the printing direction ranges from about 10 microns to about 85 microns, located over and coupled to the microprismatic retroreflective film.

BRIEF DESCRIPTION OF THE DRAWINGS

For a more complete understanding of the invention, reference is now made to the following descriptions taken in conjunction with the accompanying drawings, in which.

DETAILED DESCRIPTION OF CERTAIN ASPECTS AND EMBODIMENTS

Certain embodiments set forth herein describe an alternative retroreflective film construction to produce an appropriate printing surface on the face of the retroreflective sheeting that is capable of producing high quality prints through thermal transfer printing, laser printing, ink jet printing, or other print methodologies. This retroreflective film can be successfully used in the fabrication of retroreflective number plates or other signs that require a high quality print of lettering or images.

Figure 1A:
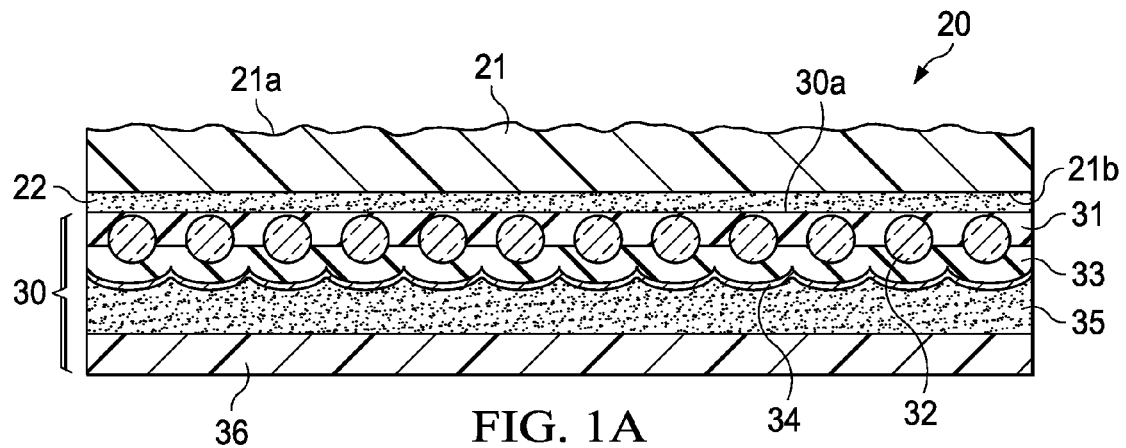
FIGS. 1A-1C illustrate different embodiments of the invention.

In one aspect of the invention, a polymeric face film is used as an outer-layer of the retroreflective film where the polymeric face film possesses a proper surface roughness profile to allow for high quality printing and where the polymeric face film is produced from an extrusion manufacturing process. FIG. 1A depicts one embodiment of the new retroreflective film construction where the polymeric face film is the face film of an enclosed lens retroreflective sheeting construction.

As shown in FIG. 1A, retroreflective film 20 contains a polymeric face film 21. The polymeric face film 21 has an outer surface 21a and an inner-surface 21b. In one application, the outer surface 21a contains a surface texture with the proper surface roughness profile to allow for successful printing during the fabrication of retroreflective number plates.

After the alphanumeric characters of the number plate are printed on the outer surface 21a, the film 20 can be adhesively laminated to a clear plastic plate.

There are several different methods to incorporate polymeric face film 21 into the construction of retroreflective film 20. As shown in FIG. 1A, polymeric face film 21 can be laminated to a retroreflective sub-structure 30 through the use of an optically clear laminating adhesive 22. The retroreflective sub-structure 30 can in its own right be considered a very thin gauge version of an enclosed lens retroreflective sheeting as it contains its own top-coat layer 31, glass microspheres 32, spacing layer 33, metalized reflecting coating layer 34, adhesive layer 35, and backing film layer 36. To manufacture the retroreflective film 20 depicted in FIG. 1A, the retroreflective sub-structure 30 is first manufactured according to typical manufacturing techniques for enclosed lens sheeting. Then, after removing any temporary carrier films used during the manufacture of the retroreflective sub-structure 30, the polymeric face film 21 can be adhesive laminated to the face 30a of the retroreflective sub-structure 30.

Figure 1B:
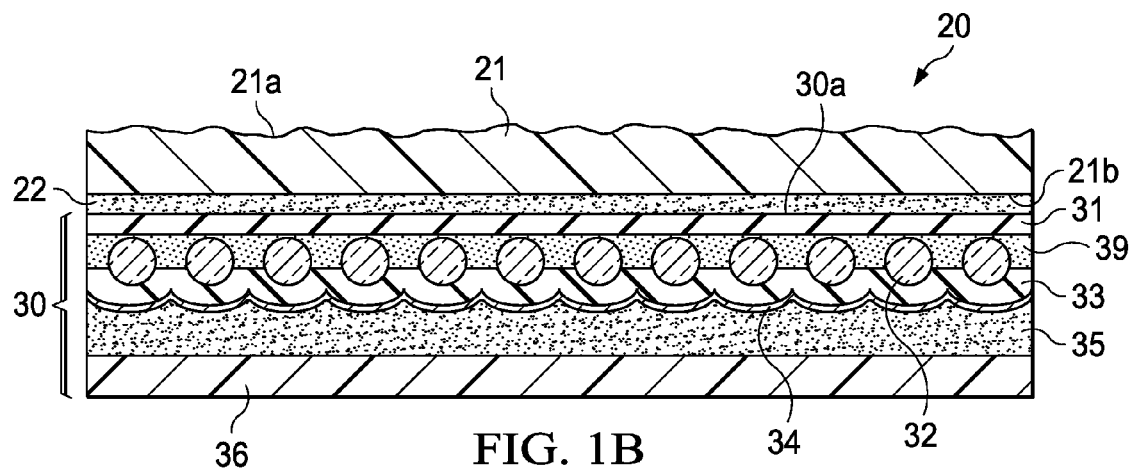

It may also be preferable to include an optional bead bond layer 39 between top-coat 31 and the glass microspheres 32 in the retroreflective sub-structure, as seen in FIG. 1B.

Figure 1C:
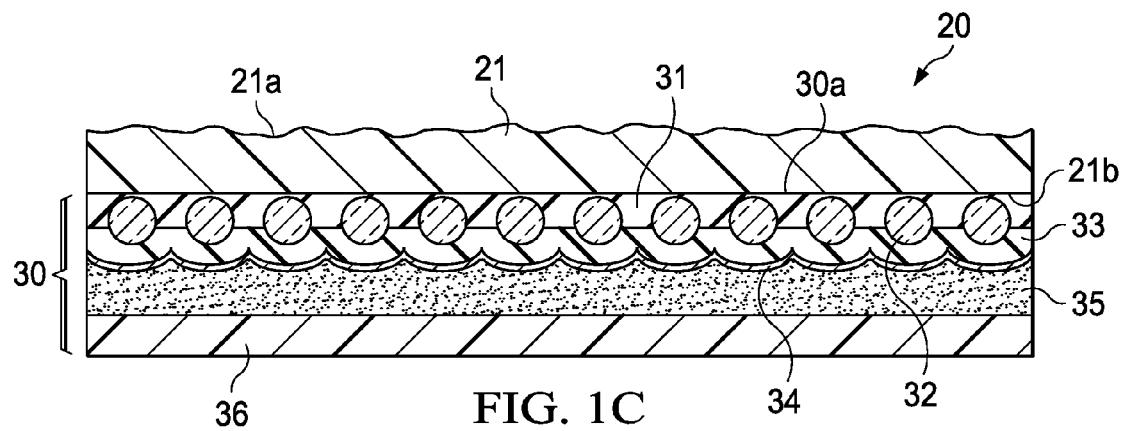

Alternatively, as shown in FIG. 1C, the polymeric face film 21 can be directly bonded to the retroreflective sub-structure 30 without the use of a laminating adhesive. To manufacture this construction, the polymeric face film 21 will replace the use of any temporary carrier films, and the top-coat can be directly coated onto the inner surface 21b of the polymeric face film 21.

It is beneficial for the surface 21a of the polymeric face film 21, and therefore the surface of the retroreflective sheeting 20, to have the proper surface roughness profile to ensure that high quality prints can be achieved through thermal transfer, laser, ink jet, and other printing methods. For example, in certain embodiments, it may be desirable to have a matte surface on the outer surface 21a of the polymeric face film 21. However, not any matte surface will function as an acceptable printing surface for the fabrication of the retroreflective number plates. In fact, in some instances, two different polymeric films may generally have the same matte appearance and gloss level but still result in different print qualities. More surprisingly, these same two polymeric films may even have the same depth of surface texture that create the matte surface, but the two films may still not produce the same printing quality.

Thus, to ensure a high quality of print on the film, the surface roughness profile of surface 21a preferably has an Arithmetic Mean Deviation of the Roughness Profile (Ra) between about 0.18 microns and about 1.30 microns, and it also preferably has a Mean Spacing of Local Peaks (R-S) in the direction of printing ranging from about 10 microns to about 85 microns. More preferably, the Arithmetic Mean Deviation of the Roughness Profile (Ra) is between about 0.18 microns and about 1.00 microns and the Mean Spacing of Local Peaks (R-S) in the direction of printing is less than about 85 µm. Still even more preferably, the Arithmetic Mean Deviation of the Roughness Profile (Ra) is between about 0.25 microns and about 0.55 microns and the Mean Spacing of Local Peaks (R-S) in the direction of printing is between about 20 microns and about 80 microns. In advantageous embodiments, both of these parameters are considered and within the specified ranges to ensure high quality printing.

It is generally understood that many different variables can impact the overall quality of a print. Surrounding environmental conditions such as room temperature or humidity can lead to undesirable printing results. Similarly, cleanliness of the printing environment is important as air-borne dust particles or other contaminants can also lead to undesirable printing results. Additionally, most printers allow the user to adjust several different operating parameters such as printing speed, printing temperature, or similar variables. Given all of these many different variables, those skilled in the art will recognize that it is not expected that any given embodiment of this invention will perfectly print in all possible circumstances. However, we have found that the most robust embodiment of this invention which will provide acceptable printing results under a wide variety of printing conditions and environmental variables will have surface roughness profiles where the Arithmetic Mean Deviation of the Roughness Profile (Ra) ranges from about 0.30 microns to about 0.50 microns and where the Mean Spacing of Local Peaks (R-S) in the print direction ranges from about 25 microns to about 55 microns.

Surface roughness profiles can be measured by following the JIS B0601-2001 standard utilizing 5 samples for each measurement. The length of each sample can be 0.8 mm for an overall evaluation length of each measurement of 4.0 mm. The preferred measurement traversing speed is 0.5 mm/sec., and the results are preferably filtered using the Gaussian filter standard. Mitutoyo Corporation of Kanagawa, Japan manufactures several instruments capable of measuring the surface roughness profile. The Mitutoyo SurfTest SJ-301 Surface Roughness Tester is one such instrument.

Figure 2A:
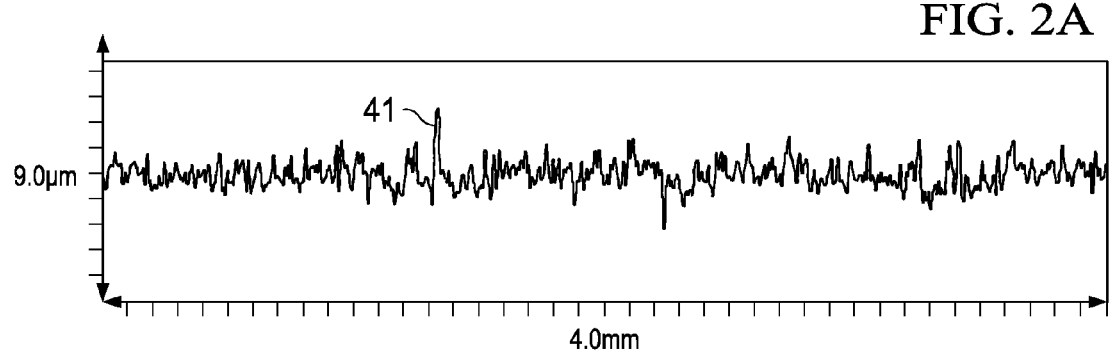
FIGS. 2A-2B contrast surface roughness profiles of two different samples measured in the printing direction, wherein 2A illustrates the surface roughness profile of an embodiment of the present invention.
Figure 2B:
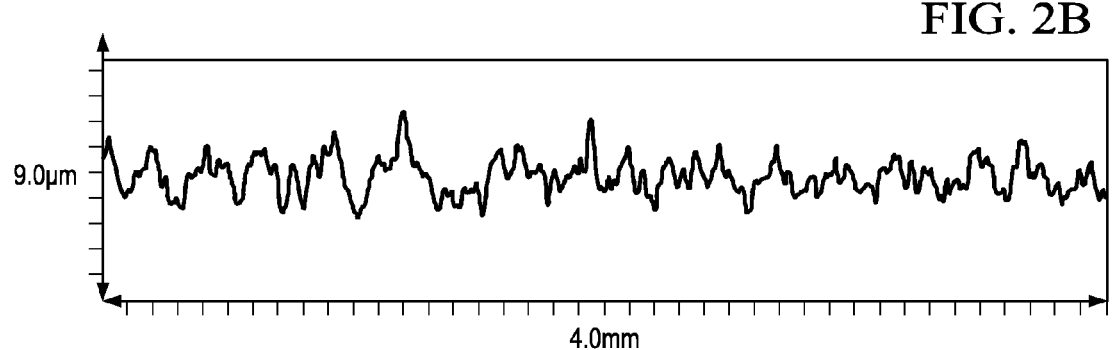

FIGS. 2A and 2B depict the surface roughness profiles of two different retroreflective film samples measured in the printing direction using a Mitutoyo SurfTest SJ-301 Surface Roughness Tester. The y-axis in each figure represents the height and depth of various peaks and valleys as measured along the outer printing surface of each sample. In each figure, the total distance represented by the y-axis is 9 microns. Thus, the height of peak 41 in FIG. 2A is approximately 3.2 microns. The x-axis in both Figures represents the total evaluation length of each sample of 4.0 mm. The sample profiled in FIG. 2A is an enclosed lens retroreflective sheeting manufactured in accordance with an embodiment of the invention and contains a rigid vinyl polymeric face film having the proper surface roughness profile, which can be successfully printed to produce a high quality thermal transfer print. The sample producing the profile of FIG. 2B, is also an enclosed lens retroreflective sheeting containing a rigid vinyl polymeric face film. However, the sample of FIG. 2B does not contain the proper surface roughness profile on its outer surface to ensure a high quality print even though the sample of FIG. 2B has both a matte appearance very similar to that of the sample producing the profile in FIG. 2A and an Ra value within the desired range. When printed on a thermal transfer printer, the sample of FIG. 2B produces a high degree of smudging and smearing, particularly when printing letters such as "E", "F", "H" or "T" from left-to-right, where there exists a long horizontal line of printing.

The difference between the two samples is the Mean Spacing of Local Peaks (R-S) as measured in the direction of printing. The sample profiled in FIG. 2A has a Ra value of about 0.38 microns and an R-S measurement in the printing direction of about 32 microns. In contrast, the sample profiled in FIG. 2B has a Ra value of about 0.55 microns and an R-S measurement in the printing direction of about 92 microns. Even though both Ra values are in the acceptable range, the sample with the profile of FIG. 2B does not consistently print properly. Without being bound by any particular theory, it is believed that the greater frequency of roughness peaks in the printing directions gives the sample a greater opportunity to "breathe" during printing. Therefore, it does not cause an excess amount of heat to be generated during the printing process that which could lead to one or more printing defects, including smudging, smearing, or poor edge quality.

It is also important to maintain the Arithmetic Mean Deviation of the Roughness Profile (Ra) within the desired range. If the Ra is too low, an excessive amount of smudging or smearing may result. If the Ra is too high, the depth of print may be too light resulting in either incomplete print coverage or the ability to see the surface of the retroreflective sheeting through the print. The latter is especially problematic when the printing black characters on a retroreflective sheeting that is a color such as yellow. Another potential issue with a high Ra is that the retroreflective sheeting may not properly laminate to the under-side of the protective plastic plate. Tiny air bubbles may become trapped between the surface of the retroreflective sheeting and the adhesive. If this occurs, these air bubbles will act to scatter incoming light and, thus, reduce the levels of retroreflection.

For printing through laser printers, three additional aspects are important. First, the polymeric face film must be able to withstand the high temperatures associated with the toner fusion process. Second, the polymeric face film and corresponding retroreflective sheeting structure must be able to briefly hold an electrostatic charge to allow transfer of the toner from the rotating photoreceptive drum to the sheeting. Finally, there must be a sufficient intermolecular attraction between the toner and the surface of the polymeric face film to allow proper bonding and fusion of the toner particles to the surface.

With respect to the heat stability of the polymeric face film relative to the toner fusion process, the polymeric face film will preferably pass through a laser printer while still retaining its original surface roughness profile. If the heat stability is too low, then the reflective sheeting may show excessive dimensional distortion or wrinkling. Further, in some instances, this heat can actually alter the surface roughness profile of the polymeric face film and therefore that of the retroreflective sheeting as well. This change in the surface roughness profile may then negatively impact the resulting print quality. Without being bound by any particular theory, it is believed that changes to the surface roughness profile which occur during the toner fusion step will cause the toner to smear or not properly bond to the substrate. Then, as the residual toner is cleaned from the substrate in the final laser printing step, the image may further be distorted. In many instances, the printed image may also possess several light spots or bands with a faded appearance.

Therefore, it is preferable that, in addition to possessing the proper surface roughness profile, the polymeric face film also possess sufficiently high thermal properties as characterized by the Vicat softening point of the polymer. Generally speaking, polymeric face films with higher Vicat softening points, as measured by ASTM D-1525, Method B using a 5 kg load, are more heat resistant and will not be subject to significant distortion or change during laser printing. Preferably, the Vicat softening point of the polymeric face film will be about 90° C. or greater. The Vicat softening point can vary and will depend on the type of polymeric film used. For example in certain embodiments, the Vicat softening point may range from about 90° C. to about 230° C. or greater, depending on the type of film use, with "about" being within ±10° C. of each stated value and which is applicable throughout this disclosure. Yet in other embodiments, the Vicat softening point may range from 90° C. to about 200° C., while in other embodiments, the Vicat softening point may range from about 150° C. to about 200° C., which as shown below, gives good to excellent results.

Figure 3A:
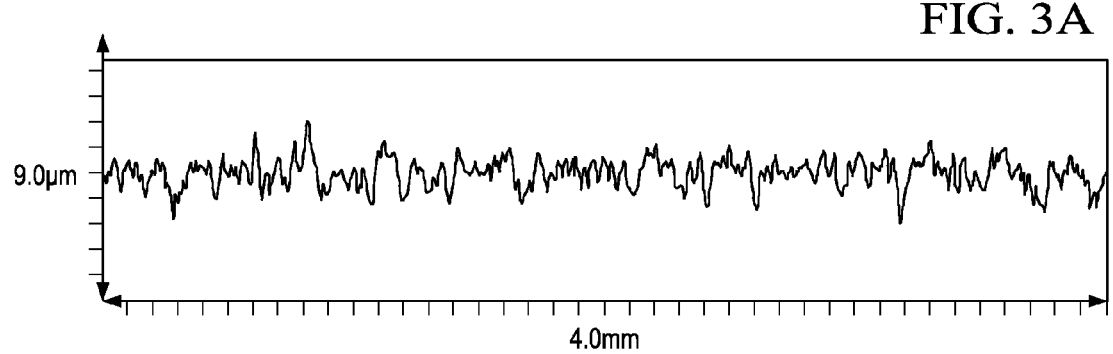
FIGS. 3A-3D contrast surface roughness profiles measured in the printing direction of different samples before and after printing the samples with a laser printer.
Figure 3B:
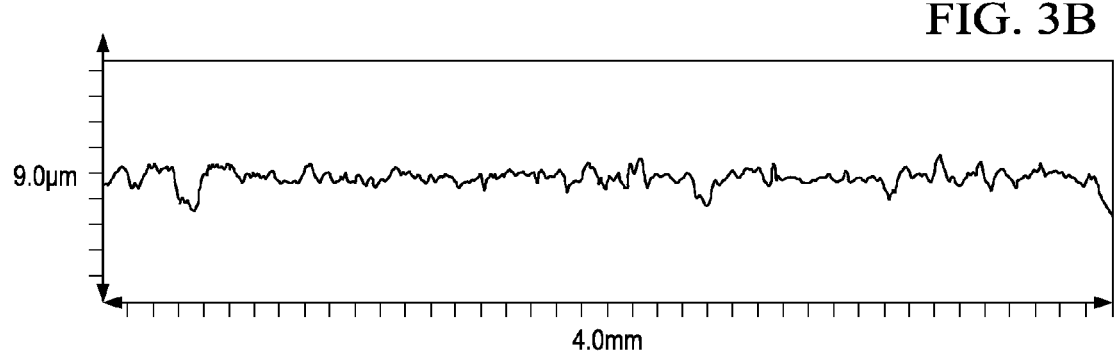
Figure 3C:
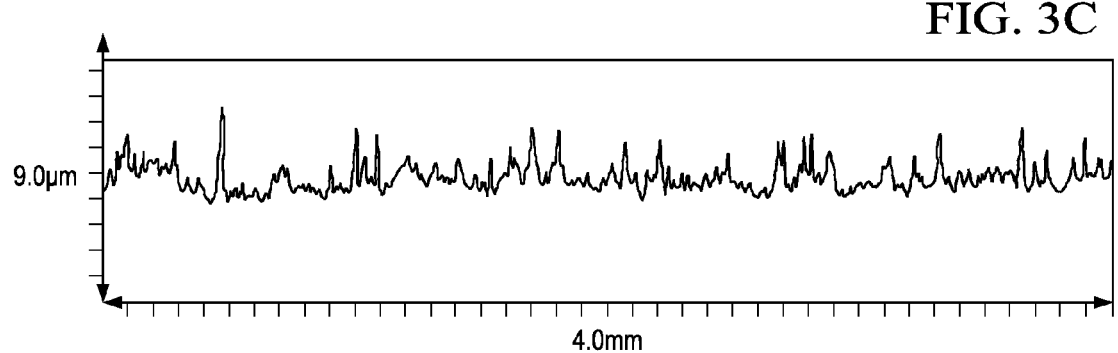
Figure 3D:
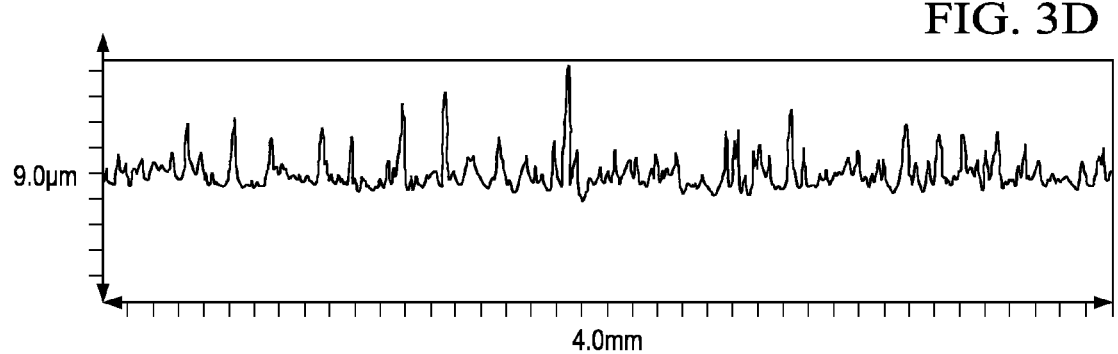

FIGS. 3A through 3D depict the surface roughness profiles of two different retroreflective sheeting samples before and after printing each sample on a Brother HL-6050D laser printer. FIG. 3A depicts the surface roughness profile of a retroreflective sheeting material containing a rigid vinyl polymeric face film before laser printing occurs. FIG. 3B depicts the surface roughness profile of the same reflective sheeting after laser printing. Similarly, FIGS. 3C and 3D respectively depict the surface roughness profiles of a reflective sheeting material containing a polyester polymeric face film before and after laser printing. As can be seen in FIGS. 3C and 3D, the reflective sheeting containing the polyester polymeric face film has nearly the same surface roughness profiles before and after laser printing. The measurement profiled in FIG. 3C has an Ra value of about 0.40 microns and an R-S measurement in the printing direction of about 46 microns.

After laser printing as shown in FIG. 3D, the sample has a Ra value of about 0.42 microns and an R-S measurement in the printing direction of about 49 microns. However, with the sample containing the rigid vinyl face film, the surface roughness profile changes during laser printing. As shown in FIG. 3A, before laser-printing, this sample had a Ra value of about 0.44 microns and an R-S measurement in the printing direction of about 41 microns. However, after laser printing, as shown in FIG. 3B, the Ra value dropped to about 0.24 microns while the R-S measurement in the direction of printing increased to about 66 microns. Upon closer inspection of the sample, it appears as if the heat from the toner fusion process "smoothed" or caused the surface to become glossier. As can be expected, the reflective sheeting sample containing the polyester polymeric face film displayed a much higher quality of print. The sample of FIGS. 3C and 3D maintained a very sharp edge quality and uniform appearance across the printed sample. On the other hand, the sample of 3A and 3B displayed rough and choppy edge lines and the printing appeared light and somewhat faded.

Although both samples initially possessed the proper surface roughness profiles, the polymeric face film of the sample in FIGS. 3C and 3D had a higher Vicat softening point. The Vicat softening point of the rigid vinyl polymeric face film of FIGS. 3A and 3B was about 65° C. On the other hand, the Vicat softening point of the polyester polymeric face film of FIGS. 3C and 3D was believed to be about 170° C. Another surprising aspect of these results is that the sample of FIG. 3B still retained a surface roughness profile in the preferred range after laser printing. However, it is believed that the rather significant change in the surface roughness profile itself which occurred during laser printing prohibited a high quality print.

It is also important that the laser printer toner successfully bond and fuse to the surface of the polymeric face film. Generally speaking, toner particles are made through an emulsion aggregation process, and there are two main types of such emulsion aggregation toners. First are acrylate-based toners, such as those described in U.S. Pat. No. 6,120,967, which is incorporated herein by reference.

Second are polyester-based toners, such as those described in U.S. Pat. No. 5,916,725, which is incorporated herein by reference.

As is readily understood, thermal bonding and adhesion will generally occur between two materials if there exists sufficient intermolecular attraction between the materials to create a strong bond. Materials with similar chemistries and thermal properties will more readily bond together than those with dissimilar chemistries. To this end, as it relates to laser printing of retroreflective sheeting, it can be understood that polyester-based toner particles will more readily bond to polyester face films.

However, not all laser printers will utilize the same type of toner particle. To further enhance the printer results across a broad range of laser printer models, it has been found to sometimes be desirable for the polymeric face film to possess an adhesion-promoting surface treatment. Such adhesion-promoting surface treatments alter the very outer surface of the polymeric face film in order to improve the wettability of the film and to improve the bondability of the toner particles to it. Further, such adhesion-promoting surface treatments can generally be applied without altering or changing the surface roughness profile of the polymeric face film. The general mechanism by which such surface treatments operate is to increase the polarity of the surface by increasing the presence of polar chemical functional groups such as hydroxyl, carbonyl, or ester groups. This, in turn, increases the surface energy of the film, commonly referred to as the dyne level (dynes/cm), which can be measured using "dyne pens" as known in the art which closely follow the test methodologies outlined in ASTM D2578.

Application of an adhesion-promoting surface treatment can usually increase the dyne level by 2 dynes/cm or more. Moreover, as known in the art, it is not uncommon for an adhesion-promoting surface treatment to increase the dyne level by 20 to 25 dynes/cm. The effectiveness of the adhesion-promoting surface treatment at increasing the dyne level of a polymeric film will be dependent upon many different variables including the specific type of treatment utilized, the type of polymeric film, and the efficiency at which the treatment is applied. Generally speaking, most polymeric films that have received an adhesion-promoting surface treatment will have a dyne level of 38 dynes/cm or more. In some instances, the dyne level can be between 39 dynes/cm to about 60 dynes/cm. Without being bond by any particular theory, this increased polarity and surface energy then allows a higher level of intermolecular attraction between the polymeric face film and the toner particles through additional van der Waals forces.

Many different adhesion-promoting surface treatments can be utilized in this invention. As used herein, an adhesion-promoting surface is one produced by, but are not limited to, chemical treatments, solvent treatments, corona treatments, flame treatments, chemical primers (such as an acrylic primer treatment), plasma treatments, UV treatments, ozone treatments, evaporated acrylate coatings, solvent etching, and other surface treatments, all of which are known to those skilled in the art. Some of the more common surface treatments include corona treatment, flame treatment, chemical treatments, plasma treatments, and chemical primers.

Another advantage of such adhesion-promoting surface treatments is that it is believed that such surface treatments can assist with the transfer of the toner from the rotating drum to the retroreflective sheeting surface and can also assist in holding the toner in position until it can be fused.

In certain advantageous embodiments, the polymeric face film is produced through an extrusion manufacturing process. As used herein, the phrase "extrusion manufacturing process" refers to any manufacturing process in which a thermoplastic resin is heated above its glass-transition temperature (in other words essentially melted) and then forced through (i.e. extruded through) an orifice or other opening. This includes film extrusion where the orifice is a narrow die which forms the width and gauge of the film. It also includes film calendaring where the heated thermoplastic resin is passed through a series of polishing rollers after exiting the extrusion orifice to provide the film width and gauge. It further includes blown film manufacturing and other film manufacturing processes. Given the teachings herein, conventional extrusion manufacturing processes may be used to form the film, such as those that can be found in "Plastics: Materials and Processing", by A. Brent Strong, Chapter 10, 1996, which is incorporated herein by reference.

The desired surface roughness profile can be imparted on the surface 21a of the polymeric face film 21 (FIG. 1A) either by passing the film across a textured roller as it is being cooled or by embossing the texture into the film during a secondary manufacturing step. The advantage of using a film produced by extrusion manufacturing processes compared to liquid coating is that no matting agents are required to produce the surface roughness profile. Further, there are no residual solvents (or other liquids) remaining in the final film. As such, the potential for pin-holes, bubbles, or other surface imperfections which could cause printing defects as discussed above is eliminated. This aspect is particularly important when laser printing as any residual solvents in the top coating may outgas and interfere with the printing and toner fusion processes. Thus, a very consistent surface roughness profile can be created on the surface of the polymeric face film (and therefore on the surface of the retroreflective sheeting).

Many different polymeric resins can be utilized to produce the polymeric face film 21, provided that the resin can be successfully processed into a thin film through an extrusion manufacturing process. Further, any resin selected must be sufficiently transparent to allow high levels of retroreflection to be maintained in the final product construction. Examples of such polymeric resins include polyester resins, such as polyethylene terephthalate (i.e. PET) or glycol-modified polyester (i.e. PETG); acrylic and acrylic co-polymers; polycarbonate resins; polyarylate; polyurethane resins, including polycarbonate-based urethanes, polyester-based urethanes, and polyether-based urethanes; vinyl resins and vinyl co-polymers, such as polyvinyl chloride; ethylene-vinyl acetate copolymers; polyamide resins; polystyrene resins; polyolefin resins, such as oriented polypropylene films (i.e. OPP); and many other resins. As previously discussed, if the final retroreflective sheeting material is to be printed with a laser printer, a resin with a Vicat softening point greater than 90° C. is preferred.

The specific resin can be selected based upon considerations such as desired durability, flexibility and stiffness, ease of handling, or cost and availability. Preferred resins included vinyl resins, polycarbonate resins, acrylic resins, and polyester resins. For thermal transfer printing or ink jet printing, most preferred are vinyl films produced from polyvinyl chloride resins. Such vinyl films can either be rigid or flexible (i.e. blended with plasticizers to impart flexibility and elastic properties to the vinyl resin). Preferred manufacturers of rigid polyvinyl chloride films include Omnova Solutions, Inc. of Fairlawn, Ohio, USA; Klockner Pentaplast of America, Inc., of Gordonsville, Va., USA; and Lonseal Corporation of Tokyo, Japan. Potential manufacturers of flexible polyvinyl chloride films include Achilles USA, Inc. of Everett, Wash., USA. For laser printing, most preferred polymeric face films are polyester films, including those made from polyethylene terephthalate resins (PET resins) due to the higher Vicat softening point. Such polyester resins generally have a Vicat softening point between 150° C. and 200° C. Possible polyester film suppliers include SKC, Inc. of Convington, Ga., USA; DuPont Teijin Films US of Chester, Va., USA; Mitsubishi Polyester Film, Inc. of Greer, S.C., USA; UFLEX Limited of Noida, India; Terphane North America of Bloomfield, N.Y., USA; and Toray Saehan, Inc., of Seoul, South Korea.

When the enclosed lens retroreflective film 20 is utilized, the backing film 36 may optionally be permanently bonded to the retroreflective sub-structure to protect the metalized reflecting coating 34. Typically, a polyester film (such as PET) may be used as the protective backing film with a gauge typically between about 25 μm and about 125 μm. In some instances, it may be preferable to include a thin friction-coating or other type of coating on the under-side of the backing film 36 to improve handling properties or other properties. In other embodiments, it may be advantageous to have a slightly textured surface on the under-side of the backing film 36 to allow for easier handling. In still other embodiments, a pigment may be added to the adhesive 35 of the reflective substructure to provide for a better appearance on the back side of the product.

In other embodiments of the invention, the backing film may be a removable release liner, which upon removal will expose the adhesive layer 35 on the reverse-side of the film. In such instances, this may allow bonding of the retroreflective film to a metal plate, sign blank, or other substrate.

Figure 4A:
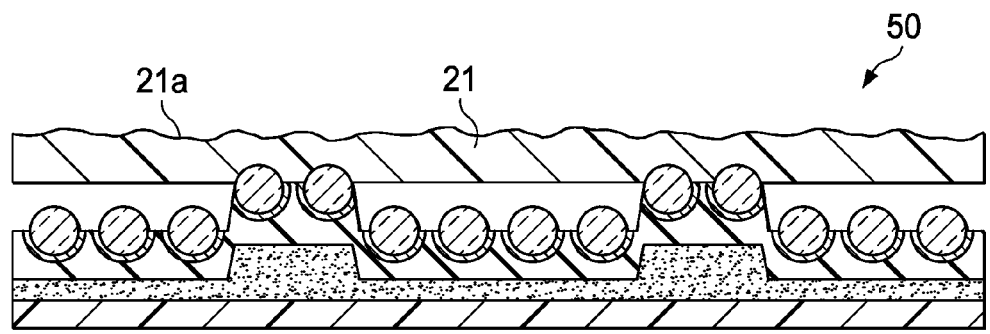
FIGS. 4A-4C illustrate additional embodiments of the invention.
Figure 4B:
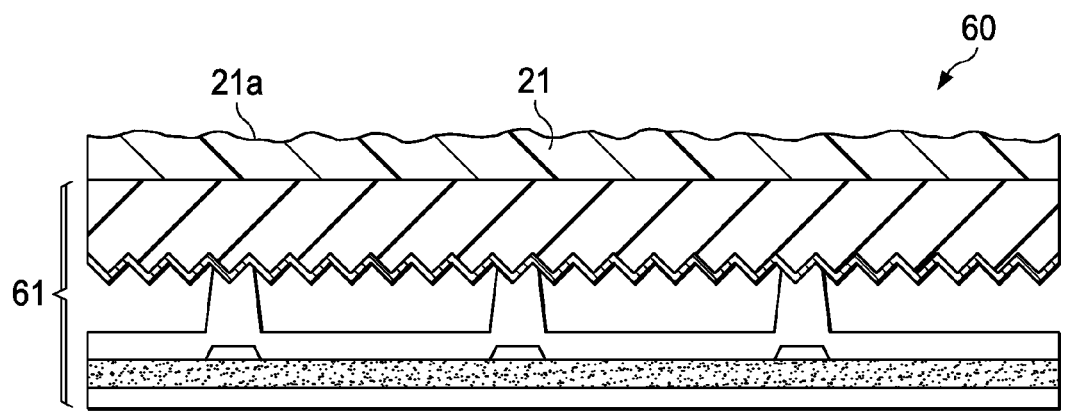
Figure 4C:
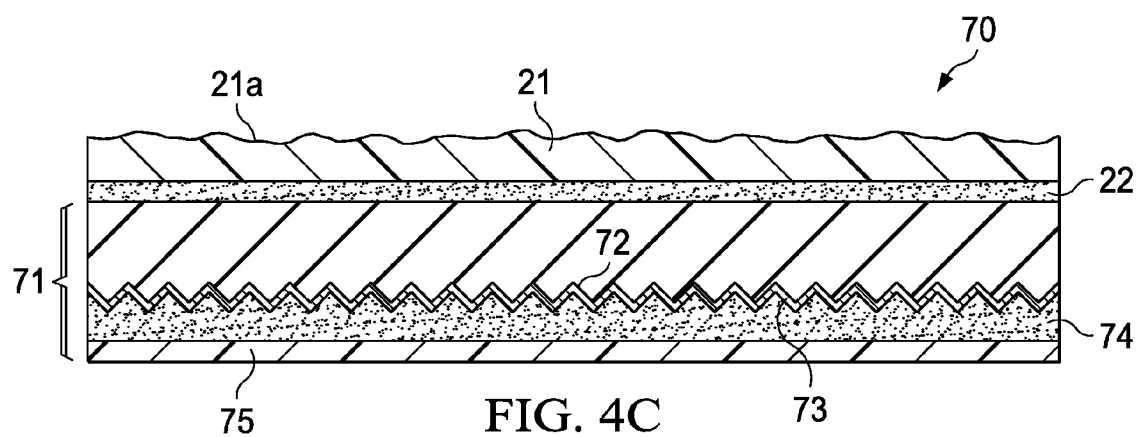

The thickness of the various layers in the retroreflective sheeting structure can be varied to induce different handling properties. For example, if stiffer sheeting is desired, the gauge of the backing film and/or the polymeric face film can be increased. However, care should be taken to avoid an excessively thick material as this may lead to printer jams. Additionally, although most of the discussion has focused on enclosed lens sheeting, the polymeric face film 21 can easily be incorporated into other retroreflective film constructions, such as encapsulated lens retroreflective sheeting or microprismatic retroreflective sheeting as shown in FIGS. 4A and 4B and 4C. FIG. 4A depicts an encapsulated lens retroreflective film 50 where the polymeric face film 21 is functioning as the outer face film of the well-known encapsulated lens sheeting construction. Alternatively, the polymeric face film 21 could be adhesive laminated or otherwise bonded to a previously manufactured encapsulated lens retroreflective sheeting. FIG. 4B depicts one embodiment of a microprismatic retroreflective film where the polymeric face film 21 is directly bonded to a microprismatic retroreflective sub-structure 61. FIG. 4C depicts an alternative embodiment of a microprismatic retroreflective film 70 where the microprismatic retroreflective optical elements 72 have been vacuum metalized to form the metalized reflective coating 73. In this embodiment, the polymeric face film 21 is bonded to the microprismatic retroreflective sub-structure 71 using an optically clear laminating adhesive 22. Backing film 75 is bonded to the reverse side of the microprismatic retroreflective film 70 with adhesive 74.

Additionally, other embodiments include adding UV-additives or light stabilizers to the polymeric film 21 or to other layers to provide improved outdoor durability. Moreover, the retroreflective film may be supplied with a printed graphic, which could be printed on either the outer-surface 21a or inner-surface 21b of the polymeric face film 21. Alternatively, it may be printed on the top-surface of the retroreflective sub-structure. In yet other embodiments, the retroreflective film could be supplied either as a white product (i.e. using a clear polymeric face film 21 with a clear top-coat 31 in the retroreflective sub-structure 30) or as a colored film, where a transparent pigment or dye is added to either the polymeric face film 21 or the top-coat 31 or another layer of the retroreflective sub-structure 30.

While most of this discussion has focused on utilizing the retroreflective film of the invention to fabricate retroreflective number plates, those skilled in the art will recognize that the invention can also be utilized to fabricate other retroreflective articles such as traffic signs, warning signs, construction work zone signs, advertising or promotional signs, mailbox labels, name plates, registration plates, or any other signing article requiring a high-level of print quality.

Different embodiments of the invention are further illustrated through the following examples.

EXAMPLES

Examples 1-10 were prepared by laminating a polymeric face film to an enclosed lens retroreflective sub-structure using an optically-clear laminating adhesive. The retroreflective sub-structure contained a thin bead-bond layer between its top-coat and the glass microspheres to produce an enclosed lens retroreflective film as illustrated in FIG. 1B. The laminating adhesive was a 25 microns thick pressure-sensitive adhesive based upon solvent-based acrylic chemistry.

In each example, the retroreflective sub-structure contained a solvent-based acrylic top-coat, a water-based acrylic bead-bond layer, glass microspheres of 350-400 mesh size with a refractive index of 2.2, a water-based acrylic spacing layer, vacuum-deposited aluminum as the metalized reflecting coating, and a solvent-based acrylic adhesive layer bonding the backing film to the mirror coating. In all examples, the backing film was a polyester (PET) film. The thickness of the top-coat in the retroreflective sub-structure ranged between 6 microns-50 microns, and the thickness of the PET backing film was either 38 microns, 50 microns, or 75 microns. All other layers were a constant thickness. By varying the thickness of these two layers, the overall gauge of the final retroreflective sheeting construction could be adjusted.

Each sample in Examples 1 through 5 was printed on either a Toshiba TEC or a Taiwan Semi-Conductor Company thermal transfer printer using a black-colored printing ribbon of 95% wax/5% resin. In Example 6, a Roland SP-300 ink jet printer was utilized. For Examples 1 through 6 and Example 9, the quality of each print was then rated as outlined below across 3 different criteria: 1) Edge Quality; 2) Amount of Smudging and Smearing; and 3) Completeness/Coverage of Print, as set forth below.

Edge Quality:

| Rating | Description |
| --- | --- |
| Very Good | Edge lines are very straight and sharp. Corners are well defined. |
| Good | Slight and occasional waviness to an edge line. Corners are still generally well defined. |
| Moderate | Some noticeable waviness to edge lines. Corners may be slightly rounded. |
| Poor | Edge lines are fuzzy and not clearly defined. Sections of edge lines may be missing. Corners have been cut at an angle or are very rounded. |

Smudging and Smearing:

| Rating | Description |
| --- | --- |
| None/Very Minor | If any smearing exists, it is only noticeable when the sample is viewed at an angle under certain lighting conditions. |
| Light | Some smearing only along horizontal bars in letters such as H, E, or F, but no significant loss of edge quality in these areas. |
| Moderate | Most visible along horizontal bars in letters such as H, E, or F with some loss in edge quality is these areas. Some slight smearing in other areas of letters as well. |
| Heavy | Noticeable smear across large sections of letters, often significantly impacting the edge quality near the defect. |
| Undefined | Due to incomplete print coverage, the amount of smudging or smearing could not be defined. |

Print Coverage/Completeness of Print:

| Rating | Description |
| --- | --- |
| Complete | Full print coverage with a deep, dark print. |
| Light | Full print coverage that is generally acceptable, but print color is not fully saturated. |
| Very Light | Full print coverage, but the print color is not fully saturated. Starting to see the surface of the reflective sheeting through the print. Not a generally acceptable print. |
| Incomplete | Incomplete print coverage. Can easily see the surface of the reflective sheeting through the print. |

The surface roughness profile of each sample was measured using a Mitutoyo SurfTest SJ-301 Surface Roughness Tester manufactured by Mitutoyo Corporation of Kanagawa, Japan. The test methodology followed that of the JIS B0601-2001 standard utilizing 5 samples for each measurement. The length of each sample was 0.8 mm for an overall evaluation length of each measurement of 4.0 mm. The measurement traversing speed was 0.5 mm/sec and the results were filtered using the Gaussian filter standard. For each retroreflective sheeting sample, 4 measurements were taken. Two measurements were taken in the print direction, and two measurements were taken perpendicular to the print direction. When reporting the Arithmetic Mean Deviation of the Roughness Profile (Ra), all fours measurements were averaged as there were not significant differences between the Ra measurements in either measurement direction. However, when reporting the Mean Spacing of Local Peaks (R-S), the measurements taken in the print direction were independently averaged from those taken perpendicular to the print direction.

Example 1

Example 1 demonstrates that a rigid vinyl film (i.e. polyvinyl chloride film), whether produced as an extruded film or a calendared film, can be successfully utilized as the polymeric face film in the invention. All samples were printed using a Taiwan Semi-Conductor Company thermal transfer printer.

| Sample ID | Polymeric Face Film | PET Backing Film Gauge (µm) | Total Sample Thickness (mils) |
| --- | --- | --- | --- |
| 1-A | Omnova Solutions 1.7 mil Rigid Vinyl Film, Frosted Matte Surface (Extruded Film) [1] | 38 µm | 8.1 mils |
| 1-B | Klockner 280/24 Rigid Vinyl Film, 3 mil Film with Dull Matte Surface (Calendared Film) [2] | 50 µm | 9.8 mils |
| 1-C | Omnova Solutions 2.0 mil Rigid Vinyl Film, Dull Matte Surface (Extruded Film) [1] | 50 µm | 9.2 mils |
| 1-D | Klockner 280/24 Rigid Vinyl Film, 2.7 mil Film with Dull Matte Surface (Calendared Film) [2] | 75 µm | 10.7 mils |
| 1-E | Lonseal 41 µm Rigid Vinyl Film with "Normal" Gloss Surface of 40 Gloss at 60° (Calendared Film) [3] | 50 µm | 8.6 mils |

[1] Available from Omnova Solutions, Inc. of Fairlawn, Ohio, USA
[2] Available from Klöckner Pentaplast of America, Inc., of Gordonsville, Virginia, USA
[3] Available from Lonseal Corporation of Tokyo, Japan

| | | Surface Roughness Profile | | Print Results | |
| --- | --- | --- | --- | --- | --- |
| Sample ID | Ra (µm) | R-S (Print Direction) (µm) | R-S (Perpendicular) (µm) | Edge Quality | Smudging/ Smearing | Print Coverage |
| 1-A | 0.21 µm | 35 µm | 27 µm | Very Good | None/Very Minor | Complete |
| 1-B | 0.37 µm | 46.5 µm | 37.5 µm | Very Good | Light | Complete |
| 1-C | 0.40 µm | 31 µm | 34.5 µm | Very Good | None/Very Minor | Complete |
| 1-D | 0.40 µm | 47 µm | 41.5 µm | Very Good | None/Very Minor | Complete |
| 1-E | 0.47 µm | 72 µm | 77 µm | Very Good | None/Very Minor | Complete |

Example 2

Example 2 demonstrates that there exists an upper limit to the depth of surface texture in which an acceptable print can be achieved. As shown in this example, if the Arithmetic Mean Deviation of the Roughness Profile (Ra) is above a level of approximately 1.50 µm, the print coverage will be too poor to provide for an acceptable print. Samples 2-A and 2-B were printed using a Taiwan Semi-Conductor Company thermal transfer printer. Sample 2-C was printed with a Toshiba TEC thermal transfer printer.

| Sample ID | Polymeric Face Film | PET Backing Film Gauge (µm) | Total Sample Thickness (mils) |
|---|---|---|---|
| 2-A | Lonseal 4 mil Rigid Vinyl Film with Embossed Matte Surface (Calendared Film) [1] | 38 µm | 10.3 mils |
| 2-B | Lonseal 45 µm Rigid Vinyl Film with "Low Gloss" Matte Surface of 20 Gloss at 60° (Calendared Film) [1] | 50 µm | 8.7 mils |
| 2-C | Klockner 280/36 Rigid Vinyl Film, 5.0 mil Film with Embossed Matte Surface (Calendared Film) [2] | 38 µm | 13.8 mils |

[1] Available from Lonseal Corporation of Tokyo, Japan
[2] Available from Klöckner Pentaplast of America, Inc., of Gordonsville, Virginia, USA

| Sample ID | Surface Roughness Profile Ra (µm) | R-S (Print Direction) (µm) | R-S (Perpendicular) (µm) | Edge Quality | Print Results Smudging/Smearing | Print Coverage |
|---|---|---|---|---|---|---|
| 2-A | 1.65 µm | 161 µm | 147.5 µm | Poor | Undefined | Incomplete |
| 2-B | 1.87 µm | 134.5 µm | 117 µm | Good | None/Very Minor | Very Light |
| 2-C | 2.53 µm | 185.5 µm | 167.5 µm | Poor | Undefined | Incomplete |

Example 3

Example 3 demonstrates that other polymeric materials in addition to rigid vinyl films can be successfully utilized as the polymeric face film in the invention. With respect to Sample 3-A, it is believed that the surface texture of the film was nearing the upper limit of an acceptable Ra value and therefore starting to cause a slightly imperfect edge. As such, because of the generally positive print results on Sample 3-A, it is anticipated that lowering the Ra to below 1.00 µm, or even more preferably to below about 0.60 µm could further improve the quality of edge printing and the completeness of the print coverage.

| Sample ID | Polymeric Face Film | PET Backing Film Gauge (µm) | Total Sample Thickness (mils) |
|---|---|---|---|
| 3-A | Longhua Polycarbonate PC-813, 3 mil Film with Matte Surface (Extruded Film) [1] | 38 µm | 9.55 mils |
| 3-B | Achilles KMC425 3.4 mil/1.5 H C01 Flexible Plasticized PVC Film (Calendared Film) [2] | 50 µm | 10.4 mils |
| 3-C | Omnova Solutions 1.1 mil PETG Co-polyester Film, Flat Matte Surface (Extruded Film) [3] | 50 µm | 8.2 mils |
| 3-D | SKC SD15 Matte PET Polyester Film, 1.5 mils (Extruded Film) [4] | 75 µm | 9.4 mils |

[1] Available from Mianyang Longhua Film Co., Ltd. of Mianyang, Sichuan, China
[2] Available from Achilles USA, Inc. of Everett, Washington, USA
[3] Available from Omnova Solutions, Inc. of Fairlawn, Ohio, USA
[4] Available from from SKC, Inc. of Covington, Georgia, USA

| | | Surface Roughness Profile | | Print Results | | |
|---|---|---|---|---|---|---|
| Sample ID | Ra (μm) | R-S (Print Direction) (μm) | R-S (Perpendicular) (um) | Edge Quality | Smudging/ Smearing | Print Coverage |
| 3-A | 1.28 μm | 53 μm | 49.5 μm | Good | None/Very Minor | Light |
| 3-B | 0.44 μm | 64.5 μm | 60 μm | Very Good | None/Very Minor | Complete |
| 3-C | 0.38 μm | 45.5 μm | 39 μm | Good | None/Very Minor | Complete |
| 3-D | 0.23 μm | 31.5 μm | 33.5 μm | Good | None/Very Minor | Complete |

Example 4

Example 4 demonstrates the benefits of maintaining the Mean Spacing of Local Peaks (R-S) in the print direction below 85 μm. A comparison of the print results of the samples in Example 4 with those of Example 1 and Example 3 shows that the print quality can diminish with respect to both edge definition and the amount of smudging and smearing when the R-S in the print direction is greater than 85 μm. What is particularly surprising with Sample 4-A is that the surface appearance and depth of surface texture (as measured by Ra) of Sample 4-A is very similar to other samples that demonstrated positive printing results. Further, the average R-S value across the entire sample (i.e. averaging the R-S for the print direction with the perpendicular direction) is approximately 73, which is comparable to the R-S of other samples that yielded strong print results (eg. Sample 1-E). However, it is believed that because the R-S as measured in the direction of printing is relatively high, a heavy amount of smearing and smudging appeared.

| Sample ID | Polymeric Face Film | PET Backing Film Gauge (μm) | Total Sample Thickness (mils) |
|---|---|---|---|
| 4-A | Klockner 254 V15 Rigid Vinyl Film, 5 mil Film with Dull Matte Surface (Calendared Film) [1] | 38 μm | 11.1 mils |
| 4-B | Klockner 280/24 Rigid Vinyl Film, 3 mil Film with Gloss Surface Out (Calendared Film) [1] | 38 μm | 9.2 mils |

[1] Available from Klöckner Pentaplast of America, Inc., of Gordonsville, Virginia, USA

| | | Surface Roughness Profile | | Print Results | | |
|---|---|---|---|---|---|---|
| Sample ID | Ra (μm) | R-S (Print Direction) (μm) | R-S (Perpendicular) (μm) | Edge Quality | Smudging/ Smearing | Print Coverage |
| 4-A | 0.62 μm | 90 μm | 56.5 μm | Good | Heavy | Complete |
| 4-B | 0.44 μm | 124 μm | 54.5 μm | Poor | Moderate | Complete |

Example 5

Example 5 demonstrates that there exists a lower limit to the depth of surface texture in which an acceptable print can be achieved. As shown in this example, if the Arithmetic Mean Deviation of the Roughness Profile (Ra) is below a level of approximately 0.15, smudging and smearing may be too extensive to provide for an acceptable print. Samples 5-A and 5-B were printed using a Toshiba TEC thermal transfer printer. Sample 5-C, 5-D, and 5-E were printed with a Taiwan Semi-Conductor Company thermal transfer printer. One surprising aspect of these results is that the polymer face films of Samples 5-A, 5-B, and 5-E all contain a thin coating on the outer surface in order to improve printability. However, in all three instances, each film displayed unacceptable print quality with respect to smudging and smearing.

| Sample ID | Polymeric Face Film | PET Backing Film Gauge (μm) | Total Sample Thickness (mils) |
|---|---|---|---|
| 5-A | Innovia Films, Rayoart CGS-360 OPP Film with a print receptive acrylic top-coat. 3.6 mil Film. (Extruded Film) [1] | 50 μm | 12.4 mils |
| 5-B | Exxon Mobil 50LL537, 2 mil OPP Film with a print receptive acrylic top-coat. (Extruded Film) [2] | 38 μm | 10.0 mils |
| 5-C | Longhua Polycarbonate PC-813, 3 mil Film with Gloss Surface (Extruded Film) [3] | 38 μm | 9.55 mils |
| 5-D | DR Acrylic Film, 4.6 mils, Gloss Surface (Extruded Film) [4] | 50 μm | 11.9 mils |

-continued

| Sample ID | Polymeric Face Film | PET Backing Film Gauge (μm) | Total Sample Thickness (mils) |
|---|---|---|---|
| 5-E | SKC SH82 PET Polyester Film, 2 mils (Extruded Film) [5] | 50 μm | 9.1 mils |

[1] Available from Innovia Films, Inc. of Atlanta, Georgia, USA
[2] Available from Exxon Mobil Corporation of Houston, Texas, USA
[3] Available from Mianyang Longhua Film Co., Ltd. of Mianyang, Sichuan, China
[4] Available from Custom Extrusion Technologies of Lakewood, New Jersey, USA
[5] Available from SKC, Inc. of Covington, Georgia, USA

| | | Surface Roughness Profile | | | Print Results | |
|---|---|---|---|---|---|---|
| Sample ID | Ra (μm) | R-S (Print Direction) (μm) | R-S (Perpendicular) (μm) | Edge Quality | Smudging/ Smearing | Print Coverage |
| 5-A | 0.15 μm | 24.5 μm | 66 μm | Moderate | Heavy | Complete |
| 5-B | 0.11 μm | 42 μm | 34.5 μm | Good | Heavy | Complete |
| 5-C | 0.10 μm | 30.5 μm | 38 μm | Good | Moderate | Complete |
| 5-D | 0.10 μm | 16.5 μm | 19 μm | Good | Moderate | Complete |
| 5-E | 0.17 μm [1] | Too Low - Not Measurable | 21.5 | Good | Moderate | Light |

[1] Because of large differences between the Ra measurements in the print direction and perpendicular direction, only the print direction values are reported.

Example 6

Example 6 demonstrates that strong printing results can also be obtained using an ink jet printer instead of a thermal transfer printer. Sample 6-A was prepared using the same polymeric face film as Sample 1-C. Thus, the sample had the same surface roughness profile. However, the PET backing film gauge was 75 μm for a total sample thickness of 10.2 mils. The ink jet printer was a Roland SP-300 printer with Roland Eco-Sol Max printing inks. The printer settings were set for 720 DPI resolution, 1 over-print, and a head pass setting of 32. Temperature settings were 36° C. for the heater and 40° for the dryer. Using these printer settings, a variety of letters in a number of different colors were printed across the sample. The results are summarized in the table below.

Printing Results for Sample 6-A

| Letter Printed | Color | % of Printer Head Output for Each CMYK Color | Edge Quality | Smudging/ Smearing | Print Coverage |
|---|---|---|---|---|---|
| H | Black | 90% Black | Very Good | None/Very Minor | Complete |
| T | Blue 1 | 100% Cyan, 10% Magenta | Very Good | None/Very Minor | Complete |
| E | Blue 2 | 100% Cyan, 20% Magenta | Very Good | None/Very Minor | Complete |
| F | Yellow | 75% Yellow, 5% Magenta | Very Good | None/Very Minor | Complete |

Example 7

Example 7 demonstrates how strong printing results can be obtained on a laser printer using a polymeric face film having the proper surface roughness profile and a Vicat softening point of about 90° C. or greater. In this example, each sample was printed on a Brother HL-6050D laser printer using the default plain paper settings. The size of each sample was approximately 7 inches wide by 9 inches long. Several large bold characters and graphics were printed across the surface of each retroreflective film sample with approximately 65% of the total sample area being printed. To assess the quality of the laser print, slightly different criteria were utilized due to the different nature of the printing process as set forth below.

Edge Quality of Laser Printing:

| Rating | Description |
|---|---|
| Very Good | Edge lines are very straight and sharp. Corners are well defined. Curves are well rounded and not wavy. Nearly identical appearance to printing on office paper. |
| Good | Slight and occasional fuzzy appearance in a corner or curved edge. Long straight lines and edges are generally straight and smooth. |
| Fair | Some noticeable waviness or fuzziness along straight lines or long edges. Leading edge of a few characters is fuzzy. Corners and rounded edges not well defined. |
| Poor | Leading edge of all characters or images is fuzzy and choppy. Long straight lines are rough, jagged, and disjointed. |

Definition of Small Characters:

| Rating | Description |
|---|---|
| Excellent | All letters and numbers are pronounced and very legible. All edges and corners are crisp and well-defined. Nearly identical to printing on office paper. |
| Good | Leading edge of some characters is somewhat faint and not perfectly defined. Some characters are not as bold or pronounced as others. Still very legible. |

-continued

| Rating | Description |
|---|---|
| Fair | Leading edge of letters and numbers is somewhat choppy or rough. A slight halo or shadowing effect is noticeable around each character. Still generally legible, but may be difficult to read from certain viewing angles. |
| Poor | Noticeable portions of letters or numbers are missing or appear very faint. Edges are choppy and fragmented. May have significant halo or shadowing effect. |

Presence of Secondary Repeated Images:

| Rating | Description |
|---|---|
| None | Each individual character or symbol only appeared once. No evidence of any secondary repeating images. Nearly identical appearance to printing on office paper. |
| Very Light | Very faint secondary imaging may be presence upon close inspection. Does not impact printing of subsequent characters. |
| Moderate | Some noticeable secondary repeated images, but the print quality of subsequent characters or symbols is not greatly impacted. |
| Heavy | Nearly every character or symbol appeared a second or third time. Print quality of subsequent characters or symbols is significantly and negatively impacted. |

Consistency of Print:

| Rating | Description |
|---|---|
| Very Good | Full print coverage with a deep, dark print. No significant or obvious areas where the print is less pronounced or appears faded. |
| Good | Occasional band where the depth and saturation of the print is lighter than adjacent areas. Otherwise, generally pronounced and bold appearance. |
| Fair | Frequent bands of light and unsaturated printing. Some very slight print voids. |
| Poor | Contains multiple bands where the print is very light and appears faded. Numerous print voids. |

As shown in the table below, when the Vicat softening point of the polymeric face film is less than about 90° C., the resulting print quality through a laser printer may not be acceptable for many applications. The best results were obtained using a polymeric face film of polyethylene terephthalate (PET) polyester since the Vicat softening point of this polymer is significantly higher than 90° C., between about 150° C. to 200° C. Example 7 also demonstrates the importance of maintaining the proper surface roughness profile. It is believed that Sample 7-A yielded a poor laser print quality because the Arithmetic Mean Deviation of the Roughness Profile (Ra) was below 0.18 microns, even though the Vicat softening point was substantially greater than 90° C. What is further surprising about the relatively poor printing results of Sample 7-A is that the polymeric face film of this retroreflective film sample contained an acrylic primer surface treatment designed to generally improve printing results, and, as shown below in Example 8, such surface treatments can often enhance the quality of laser prints.

| Sample ID | Polymeric Face Film | PET Backing Film Gauge (μm) | Total Sample Thickness (mils) |
|---|---|---|---|
| 7-A | SKC SH82 PET Polyester Film, 50 micron gauge with acrylic primer surface treatment (Extruded Film) [1] | 75 μm | 10.1 mils |
| 7-B | Dupont EB-11, PET Polyester Film, 23 micron gauge. No surface treatment. (Extruded Film) [2] | 75 μm | 9.1 mils |
| 7-C | Mitsubishi Polyester, MT01 Polyester PET Film, 20 micron gauge. No surface treatment (Extruded Film) [3] | 75 μm | 9.0 mils |
| 7-D | Klockner 280/24 Rigid Vinyl Film, 2.7 mil Film with Dull Matte Surface (Calendared Film) [4] | 75 μm | 10.7 mils |
| 7-E | Extruded polyester co-polymer (PETG) film, 35 micron gauge, of Eastman Chemical Cadence Copolyester GS2 resin. No surface treatment. [5] | 75 μm | 9.5 mils |
| 7-F | Extruded acrylic film, 50 micron gauge, of Arkema, Plexiglas ® DR-101 acrylic resin. No surface treatment. [6] | 75 μm | 10.1 mils |

[1] Available from SKC, Inc. of Covington, Georgia, USA
[2] Available from Dupont Teijin Films U.S. of Hopewell, Virginia, USA
[3] Available from Mitsubishi Polyester Film, Inc. of Greer, South Carolina, USA
[4] Available from Klöckner Pentaplast of America, Inc., of Gordonsville, Virginia, USA
[5] Available from Eastman Chemical Company of Kingsport, Tennessee, USA
[6] Available from Arkema, Inc. of Philadelphia, Pennsylvania, USA

| | Surface Roughness Profile (Before Laser Printing) | | | Vicat | Print Results | | | |
|---|---|---|---|---|---|---|---|---|
| Sample ID | Ra (μm) | R-S (Print Direction) (μm) | R-S (Perpendicular) (μm) | Softening Point (° C.) | Edge Quality | Small Character Definition | Secondary Repeated Images | Print Consistency |
| 7-A | 0.09 μm | 28 μm | 25.5 μm | 170° C. | Poor | Poor | None | Poor |
| 7-B | 0.30 μm | 73 μm | 67 μm | 170-175° C. | Good | Excellent | None | Good |

-continued

| Sample ID | Surface Roughness Profile (Before Laser Printing) | | | Vicat Softening Point (° C.) | Print Results | | | |
|---|---|---|---|---|---|---|---|---|
| | Ra (μm) | R-S (Print Direction) (μm) | R-S (Perpendicular) (μm) | | Edge Quality | Small Character Definition | Secondary Repeated Images | Print Consistency |
| 7-C | .54 μm | 51 μm | 63 μm | 150-200° C. | Good | Good | None | Very Good |
| 7-D | 0.40 μm | 47 μm | 41.5 μm | 65° C. | Poor | Moderate | None | Good |
| 7-E | 0.34 μm | 31.5 μm | 36.5 μm | 81° C. | Fair | Fair | None | Good |
| 7-F | 0.63 μm | 41 μm | 50.5 μm | 86° C. | Fair | Poor | None | Good |

Example 8

Example 8 demonstrates how the print quality through a laser printer can further be improved by treating the polymeric face film with an adhesion-promoting surface treatment. Samples 8-A, 8-B, and 8-C each incorporated a polyester face film, similar to the polyester polymeric face film of Samples 7-B and 7-C. However, in each instance, the surface of the polyermic face film was treated with an adhesion-promoting surface treatment. Sample 8-D demonstrates that an adhesion-promoting surface treatment alone will not improve the quality of laser printing when the Vicat softening point of the polymeric face film is below 90° C., even if the material contains the proper surface roughness profile.

| Sample ID | Polymeric Face Film | PET Backing Film Gauge (μm) | Total Sample Thickness (mils) |
|---|---|---|---|
| 8-A | UFLEX, FLEXPET, F-MAT Polyester PET Film, 23 micron gauge with corona surface treatment (Extruded Film) [1] | 75 μm | 9.1 mils |
| 8-B | Mitsubishi Polyester, MT0R Polyester Film, 12 micron gauge with chemical surface treatment (Extruded Film) [2] | 75 μm | 8.7 mils |
| 8-C | Terphane, RMAT Polyester Film, 12 micron gauge with corona surface treatment. (Extruded Film) [3] | 75 μm | 8.7 mils |
| 8-D | Extruded acrylic film, 50 micron gauge, of Arkema, Plexiglas ® DR-101 acrylic resin. With corona surface treatment. [4] | 75 μm | 10.1 mils |

[1] Available from UFLEX Limited of Noida, India
[2] Available from Mitsubishi Polyester Film, Inc. of Greer, South Carolina, USA
[3] Available from Terphane North America of Bloomfield, New York, USA
[4] Available from Arkema, Inc. of Philadelphia, Pennsylvania, USA Example 9

Example 9 demonstrates how certain embodiments of this invention which provide high quality printing through a laser printer will also provide high quality printing results through a thermal transfer printer. In this example, several of the samples of Example 8 were printed using a Taiwan Semi-Conductor Company thermal transfer printer. The same criteria used to assess the samples of Example 1-6 were used review the print results in Example 9.

| Sample ID | Print Results | | |
|---|---|---|---|
| | Edge Quality | Smudging/Smearing | Print Coverage |
| 8-A | Very Good | None/Very Minor | Complete |
| 8-B | Very Good | None/Very Minor | Complete |
| 8-C | Very Good | None/Very Minor | Complete |

Example 10

Example 10 demonstrates the improvements achieved through certain embodiments of this invention versus a conventional material currently sold in the market, which is believed to be produced through conventional top-coating manufacturing processes. In this example, each sample was printed on an Oki C5650 laser printer using the "True Black" color setting on the printer. Each sample was approximately 4 inches high by 18 inches long and printed with several bold characters using the Microsoft "Bodoni MT Black" font with a 270 character font size. Additionally, several small characters were printed with a 18 font size. Each sample was judged using the same criteria of Examples 7 and 8.

| Sample ID | Surface Roughness Profile (Before Laser Printing) | | | Vicat Softening Point (° C.) | Print Results | | | |
|---|---|---|---|---|---|---|---|---|
| | Ra (μm) | R-S (Print Direction) (μm) | R-S (Perpendicular) (μm) | | Edge Quality | Small Character Definition | Secondary Repeated Images | Print Consistency |
| 8-A | 0.20 μm | 37.5 μm | 51.5 μm | 150-200° C. | Very Good | Excellent | None | Good |
| 8-B | 0.36 μm | 49 μm | 47.5 μm | 150-200° C. | Very Good | Excellent | None | Very Good |
| 8-C | 0.47 μm | 55.5 μm | 50.5 μm | 150-200° C. | Very Good | Excellent | None | Very Good |
| 8-D | 0.63 μm | 41 μm | 50.5 μm | 86° C. | Fair | Poor | None | Fair |

| Sample ID | Polymeric Face Film/ Sample Description | Total Sample Thickness (mils) |
|---|---|---|
| 10-A | Mitsubishi Polyester, MT0R Polyester Film, 12 micron gauge with chemical surface treatment (Extruded Film) | 8.7 mils |
| 10-B (Conventional) | Nikkalite 45700 Series Reflective Sheeting [1] | 8.7 mils |

[1] Available from Nippon Carbide Industries Co., Inc. of Tokyo, Japan

| | Surface Roughness Profile | | | Print Results | | |
|---|---|---|---|---|---|---|
| Sample ID | Ra (μm) | R-S (Print Direction) (μm) | R-S (Perpendicular) (μm) | Edge Quality | Small Character Definition | Secondary Repeated Images | Print Consistency |
| 10-A | 0.36 μm | 49 μm | 47.5 μm | Very Good | Excellent | None | Very Good |
| 10-B (Conventional) | 0.41 μm | 43 μm | 37.5 μm | Moderate | Excellent | Heavy | Poor |

| Constructions of Samples 11-A and 11-B | | |
|---|---|---|
| | Sample 11-A | Sample 11-B |
| Polymeric Face Film | Klockner 280/24 Rigid Vinyl Film, 2.7 mil Film with Dull Matte Surface (Calendered Film) [1] | Omnova Solutions 2.0 mil Rigid Vinyl Film, Dull Matte Surface (Extruded Film) [2] |
| Surface Roughness Profile | | |
| Ra (μm) | 0.37 μm | 0.44 μm |
| R-S (Print Direction) (μm) | 46 μm | 43 μm |
| R-S (Perpendicular) (μm) | 39 μm | 32 μm |
| Face Film Laminating Adhesive | Mac-Tac F2001 Transfer Adhesive [3] | Mac-Tac F2001 Transfer Adhesive [3] |
| Backing Film | Loparex 29160 3 mil HOPE Release Liner [4] | SKC SH-71E, 2 mil polyester film [5] |

[1] Available from Klöckner Pentaplast of America, Inc., of Gordonsville, Virginia, USA
[2] Available from Omnova Solutions, Inc. of Fairlawn, Ohio, USA
[3] Available from MACtac of Stow, Ohio, USA
[4] Available from Loparex, LLC of Willowbrook, Illinois, USA
[5] Available from SKC, Inc. of Covington, Georgia, USA

Example 11

Example 11 demonstrates embodiments of this invention where the retroreflective sub-structure is a microprismatic retroreflective film as shown in FIG. 3C. To prepare Samples 11-A and 11-B, three intersecting sets of parallel V-shaped grooves were cut into a brass block using a diamond-tipped tool as outlined in U.S. Pat. No. 4,588,258 to form 42 micron high forward-tilted microprisms. An electroform of the diamond-ruled brass block was then made using electrolytic deposition of nickel on the brass block to create a mirror-image replica of it. The electroform was then used as a molding tool to mold microprisms into 7 mil polycarbonate film. The molding was performed in a heated platen press with temperatures between 350° F.-400° F. and pressures of about 100 psi. The polycarbonate film was allowed to cool and then removed by hand from the electroform molding tool. At this point, the microprisms were present on one-side of the polycarbonate film.

After microprisms were molded, a thin layer of aluminum was vacuum-deposited on the surface of the microprisms to form the metalized reflective coating. This metalized microprismatic polycarbonate film then functioned as the body of the microprismatic retroreflective substructure for both Samples 11-A and 11-B. The backing film was then laminated to the metalized microprisms using a pressure-sensitive adhesive to complete the formation of the microprismatic retroreflective substructure as shown in FIG. 3C. As outlined in the table below, the backing film of Sample 11-A was a removable release liner. The backing film of Sample 11-B was a polyester film permanently bonded to the reverse side of the sample. For each sample, the polymeric face film was laminated to the upper-surface of the polycarbonate film using a transparent pressure-sensitive adhesive transfer tape. The table below identifies the materials used for the transparent polymeric face film and for the laminating adhesive used to bond the polymeric face film to the polycarbonate.

Those skilled in the art to which the invention relates will appreciate that other and further additions, deletions, substitutions and modifications may be made to the described embodiments without departing from the scope of the invention.

What is claimed is:

1. A retroreflective film, comprising:
   a retroreflective sub-structure; and
   a transparent polymeric film, having a surface roughness profile where the Arithmetic Mean Deviation of the Roughness Profile (Ra) ranges from about 0.18 microns to about 1.30 microns and where the Mean Spacing of Local Peaks (R-S) in the printing direction ranges from about 10 microns to about 85 microns, located over and coupled to the retroreflective sub-structure, and wherein the polymeric film has a Vicat softening point of about 90° C. or greater.

2. The retroreflective film recited in claim 1, wherein the retroreflective film is an enclosed lens retroreflective sheeting.

3. The retroreflective film recited in claim 1, wherein the retroreflective film is a microprismatic retroreflective sheeting.

4. The retroreflective film recited in claim 1, wherein the Arithmetic Mean Deviation of the Roughness Profile (Ra) ranges from about 0.25 microns to about 0.55 microns and the Mean Spacing of Local Peaks (R-S) in the printing direction ranges from about 20 microns to about 80 microns.

5. The retroreflective film recited in claim 1, wherein the Vicat softening point of the polymeric film ranges from about 150° C. to about 200° C.

6. The retroreflective film of claim 1, wherein the transparent polymeric film is a polyvinyl chloride or vinyl co-polymer film, a polycarbonate film, an acrylic or acrylic copolymer film, a polyester or polyester co-polymer film, or a polyolefin film.

7. The retroreflective film of claim 1, wherein the polymeric film is a polyethylene terephthalate polyester film.

8. The retroreflective film of claim 1, wherein the polymeric film is an extruded film.

9. The retroreflective film of claim 1, wherein the polymeric film includes an adhesion-promoting surface.

10. A retroreflective film, comprising:
a backing film;
a first adhesive layer located over the backing film;
an enclosed lens retroreflective film located over the first adhesive layer; and
a transparent polymeric film, having a surface roughness profile where the Arithmetic Mean Deviation of the Roughness Profile (Ra) ranges from about 0.18 microns to about 1.30 microns and where the Mean Spacing of Local Peaks (R-S) in the printing direction ranges from about 10 microns to about 85 microns, located over and coupled to the enclosed lens retroreflective film, wherein the polymer film has a Vicat softening point of about 90° C. or greater.

11. The retroreflective film recited in claim 10, wherein the surface roughness profile has an Arithmetic Mean Deviation of the Roughness Profile (Ra) which ranges from about 0.25 microns to about 0.55 microns and has a Mean Spacing of Local Peaks (R-S) in the printing direction which ranges from about 20 microns to about 80 microns.

12. The retroreflective film recited in claim 10, wherein the transparent polymeric film is an extruded film.

13. The retroreflective film recited in claim 10, wherein the transparent polymeric film is a polyvinyl chloride or vinyl co-polymer film, a polycarbonate film, an acrylic or acrylic copolymer film, a polyester or polyester co-polymer film, or a polyolefin film.

14. The retroreflective film recited in claim 10, wherein the surface roughness profile has an Arithmetic Mean Deviation of the Roughness Profile (Ra) which ranges from about 0.18 microns to about 1.0 microns and has a Mean Spacing of Local Peaks (R-S) in the printing direction less than 85 microns.

15. The retroreflective film recited in claim 10, wherein the transparent polymeric film includes an adhesion-promoting surface.

16. A retroreflective film, comprising:
a backing film;
a first adhesive layer located over the backing film;
a microprismatic retroreflective film located over the first adhesive layer; and
a transparent polymeric film, having a surface roughness profile where the Arithmetic Mean Deviation of the Roughness Profile (Ra) ranges from about 0.18 microns to about 1.30 microns and where the Mean Spacing of Local Peaks (R-S) in the printing direction ranges from about 10 microns to about 85 microns, located over and coupled to the microprismatic retroreflective film, wherein the polymeric film has a Vicat softening point of about 90° C. or greater.

17. The retroreflective film recited in claim 16, wherein the surface roughness profile has an Arithmetic Mean Deviation of the Roughness Profile (Ra) which ranges from about 0.25 microns to about 0.55 microns and has a Mean Spacing of Local Peaks (R-S) in the printing direction which ranges from about 20 microns to about 80 microns.

18. The retroreflective film recited in claim 16, wherein the transparent polymeric film is an extruded film.

19. The retroreflective film recited in claim 16, wherein the transparent polymeric film is a polyvinyl chloride or vinyl co-polymer film, a polycarbonate film, an acrylic or acrylic copolymer film, a polyester or polyester co-polymer film, or a polyolefin film.

20. The retroreflective film recited in claim 16, wherein the surface roughness profile has an Arithmetic Mean Deviation of the Roughness Profile (Ra) which ranges from about 0.18 microns to about 1.0 microns and has a Mean Spacing of Local Peaks (R-S) in the printing direction less than 85 microns.

21. The retroreflective film recited in claim 16, wherein the polymeric film has an adhesion-promoting surface.

* * * * *